Patented June 13, 1950

2,511,428

UNITED STATES PATENT OFFICE 2,511,428

ANTIOXIDANTS

Loran Oid Buxton, Maplewood, and Charles Early Dryden, East Orange, N. J., assignors to Nopco Chemical Company, Harrison, N. J., a corporation of New Jersey No Drawing. Application May 27, 1947,
Serial No. 750,893

12 Claims. (Cl. 252—400)

The present invention relates to improved antioxidants, and more particularly to such antioxidants which are especially suitable for stabilizing oleaginous materials, such as animal and vegetable fats and oils which are normally subject to oxidative deterioration, and to a process for preparing such antioxidants.

The particular class of substances for which the antioxidants of the present invention are especially useful are the marine oils such as those extracted from fish livers and the like containing vitamins A and D, and which are particularly subject to oxidation whereby the vitamin A and D content thereof is decreased. However, the antioxidants prepared by the present process may be applied to other materials of a similar nature such as fatty oils, fats, soaps, vitamin concentrates, etc. Thus, oils and fats of animal and vegetable origin such as cod liver oil as well as vitamin concentrates or vitamin-containing fractions obtained from such oils; corn oil, cottonseed oil, soyabean oil, and other vegetable oils; fats such as butter, margarine, lard, hydrogenated shortenings, palm oil, etc.; soaps of higher fatty acids; and compositions containing such fatty materials as essential ingredients as, for example, cookies, cakes, crackers, breakfast cereals, etc., as well as food emulsions such as mayonnaise; may be suitably stabilized with the antioxidants of this invention. Furthermore, substances such as sulfonated oils and other sulfonated fatty compounds, amides, mono- and diglycerides and other fatty acids which tend to become rancid upon exposure to air may be treated with the antioxidants of the present invention and are included within the term "oleaginous materials." Also included are other materials composed largely of oils, fats and the like which are subject to change upon oxidation, i. e., cosmetics such as face creams, hand lotions, shave creams, etc.

It has been previously proposed to add to materials of this general character, and particularly to fish oils and the like, a relatively small percentage of phosphatides or phospholipins such as lecithin, cephalin, cuorin, sphingomyelin, etc. It has been discovered, however, that phosphatides in themselves are not particularly good antioxidants for materials of the character set forth.

It has also been suggested in the prior art to add, in addition to phosphatides, other well known antioxidants which possess a synergistic action with the phosphatide. Such other antioxidants are tocopherols, hydroquinone, para amino phenol, and 4-tertiary butyl catechol.

In general, the compounds which exert a synergistic action in combination with phosphatides are the cyclic oxy types as, for example, quinones, hydroquinones, naphthoquinones, naphthols, naphthohydroquinones, chromans, chromens, coumarones, and coumarans.

The quinone type of compounds comprises the naphthols, quinones and quinols, including the alpha-naphthols, such as 2-methyl-1-naphthol, 3-methyl-1 naphthol, the alpha-naphthoquinones, the alpha-naphthohydroquinones, the alkyl-substituted naphthohydroquinones, such as 2-methyl-1,4-naphthohydroquinone, the benzoquinones and corresponding quinols, such as p-xyloquinone, p-xylohydroquinone, the beta-naphthoquinones, and the lapachones, such as beta-lapachone and dehydroiso-beta-lapachone.

The chroman type compounds comprise the class of chromans including the hydroxychromans, such as the 6-hydroxy-chromans, the alpha-beta-gamma-tocopherols, and the alkytocols, such as 5,7-dimethyltocol; the chromens, such as the 6-hydroxychromens and alkyl-substituted compounds, i. e., 6-hydroxy-2,2,4 trimethyl chromen, the coumarones including the hydroxycoumarones, such as the 5-hydroxycoumarones and alkyl-substituted compounds such as 5-hydroxy-2,4,6,7-tetramethyl coumarone, the coumarans including the hydroxycoumarans, such as the 5-hydroxycoumarans and alkyl-substituted compounds, i. e., 5-hydroxy 2,4,6,7-tetramethyl coumaran, and the isocoumaranones and hydroxyisocoumaranones and aromatic and alkyl-substituted compounds, such as the 5- and 7-hydroxyisocoumaranones, 3-phenyl isocoumaranone, 5-hydroxy-4,6,7-trimethyl isocoumaranone, 5-hydroxy-3-phenyl isocoumaranone, and 7-hydroxy-3-phenyl isocoumaranone, and chroman-5,6-quinones and their precursors which are associated with vitamin E.

All of the compounds noted in the previous two paragraphs are cyclic oxy compounds and thus are similar. In combination with these materials, phostatides such as lecithin exert a marked antioxidant effect which is much greater than that of the other well known antioxidants in themselves.

In accordance with the present invention, we have discovered that if a phosphatide such as lecithin is treated with a relatively small amount of ammonium hydroxide there is produced a remarkably effective antioxidant for various types of fatty materials normally prone to oxidation. Further, the ammonia-treated phosphatide is far more effective than an untreated phosphatide either alone or in combination with the other antioxidants just previously set forth.

In U. S. Patent No. 2,295,179 there is disclosed a process for treating phosphatides which are to be used as addition agents for lubricating oils. As is pointed out in that patent, phosphatides, and particularly the commercially available forms of the phosphatides, e. g., commercial lecithin, comprise a mixture of lecithin, cephalin, residual fatty oil, and free fatty acids. It is pointed out in that patent that although the addition of phosphatides to lubricating oils improves the quality of the oils in certain respects, such addition of the phosphatides to lubricating oils causes other undesirable properties to appear in the oils. As pointed out, such adverse effects are apparently caused by the acidic properties of the phosphatides or of the fatty oils occurring in the commercial mixture of phosphatides. The patentee states that such adverse effects may be prevented by the simple expedient of merely neutralizing the phosphatide materials either before or after adding it to the lubricating oil. His preferred neutralizing agents are alkyl and aromatic amines. He states, however, that ammonia or ammonium hydroxide may be used to neutralize the acidic phosphatide material if desired. Thus, mere neutralization of the acidic phosphatides prevents the corrosion of metal alloy bearing surfaces and minimizes early sludge formation in the lubricating oil, whereas when an acidic phosphatide material is added to a lubricating oil both of these adverse effects occur.

The process of the present invention is far different from that disclosed in U. S. Patent No. 2,295,179, as will be fully demonstrated hereinafter in the examples and in the description of the present process. At this point it will suffice to say that the acidity of the phosphatides treated in the present process is as great or in some cases even greater after they have been treated in accordance with the process of the invention than was the case before such treatment was carried out.

It is the object of this invention to provide new and more highly efficient antioxidants.

A further object of the invention is to provide a new process for producing highly potent antioxidants.

Other advantages and objects of the present invention will be apparent from the subsequent description and claims.

In accordance with the preferred process of the present invention, a suitable phosphatide, for example, lecithin, a solvent in which the phosphatide is at least partially soluble, and a small quantity of concentrated aqueous ammonia solution are admixed. Thereafter, the mixture is heated at about reflux temperatures for approximately an hour, although longer periods such as 3 to 5 hours may be used. Then the solvent, free and fatty acid combined ammonia, and water are removed from the treated phosphatide, e. g., by vacuum distillation.

Among the solvents which may suitably be employed in the process of the present invention are solvents such as hydrocarbon or halogenated hydrocarbon solvents, e. g., hexane, heptane, octane, ethylene dichloride, trichlorethylene, carbon tetrachloride, cyclohexane, methyl cyclohexane, or benzene. Other types of solvents which may be used are the lower molecular weight alcohols such as methanol, ethanol, propanol, isopropanol, etc. A particularly desirable solvent for use in the present process is acetone.

Preferably, the amount of solvent used should be at least equivalent to the amount of phosphatide being treated. The amount of the phosphatide in the phosphatide-solvent mixture may suitably vary from about 2% to about 50% of the solution. Mixtures of the aforementioned solvents as, for example, methanol and acetone, and also other mixtures of other suitable solvents may be used in the process, if desired. One of the most desirable solvents for use in the process of the invention is acetone which is not ordinarily considered a solvent for phosphatide material. However, for some reason, when phosphatide materials such as lecithin are treated with ammonia, better results are obtained when a solvent, such as acetone, which only partially dissolves the lecithin is used; and where, in the claims and description, the term "solvent" is used, it is to be understood that solvents are included in which phosphatides, for example, lecithin, are only partially soluble, e. g., acetone and/or methanol, as well as solvents in which the phosphatides are completely soluble.

For a fuller understanding of the nature and objects of the invention, reference may be had to the following examples which are merely illustrative and are not to be construed in a limiting sense:

EXAMPLE I

A carbon-refined shark liver oil was allowed to stand exposed to the atmosphere at 34.5° C. for a period of 6 days. At the end of this time it was found that approximately 47% of the vitamin A content thereof had been destroyed.

EXAMPLE II

To the carbon refined shark liver oil of Example I, 1% corn oil phosphatide was added and a sample of the mixed phosphatide and oil allowed to stand exposed to the atmosphere at 34.5° C. for a period of 6 days. Approximately 48 to 49% of the Vitamin A content thereof was destroyed. It is to be noted that the addition of the corn oil phosphatide to the oil of Example I did not increase the ability of the oil to withstand oxidation.

EXAMPLE III

A mixture of 10 grams of commercial soybean lecithin, having a free fatty acid content of 3.7%, 190 ml. of acetone and 10 ml. of concentrated ammonium hydroxide was refluxed for 1 hour; a portion of the lecithin dissolved in the acetone. Thereafter, the mixture was freed of solvent by heating under reduced pressure, i. e., a pressure of about 15 mm., whereby the free and fatty acid combined ammonia, and water were removed. The activated lecithin had a free fatty acid content of 3.85%. Two per cent of the activated lecithin was then added to a carbon-refined shark liver oil and the mixture allowed to stand exposed to the atmosphere at 34.5° C. The results are indicated under III in the table.

EXAMPLE IV

A solution of 10 grams of commercial soybean lecithin having a free fatty acid content of 3.7% in 190 ml. of petroleum ether and 10 ml. of concentrated ammonium hydroxide was refluxed for one hour and thereafter the solvent, free and fatty acid combined ammonia, and water were removed as set forth in Example III. The activated lecithin had a free fatty acid content of 3.7%. Two per cent of the activited lecithin was then added to carbon-refined shark liver oil, and the mixture allowed to stand at 34.5° C. exposed to the atmosphere. The results are indicated under IV in the table.

EXAMPLE V

A mixture of 10 grams of commercial soybean lecithin having a free fatty acid content of 3.7%, 90 ml. of acetone, 90 ml. of methanol and 20 ml. of ammonium hydroxide was treated as in Example IV. The activated lecithin had a free fatty acid content of 3.75%. The resultant activated lecithin was added to shark liver oil as in Example IV. The results are indicated at V in the table.

EXAMPLE VI

A solution of 10 grams of commercial soybean lecithin having a fatty acid content of 3.7% in 90 ml. of petroleum ether, 90 ml. of acetone and 20 ml. of ammonium hydroxide was treated as in the previous examples. The activated lecithin had a free fatty acid content of 3.9%. Results of stability tests on the activated lecithin are indicated at VI in the table.

EXAMPLE VII

A solution of 10 grams of commercial soybean lecithin and 100 ml. of petroleum ether, 90 ml. of methanol and 10 ml. of ammonium hydroxide was treated as in the previous examples. The results of stability tests on the treated lecithin are indicated at VII in the table.

EXAMPLE VIII

A mixture of 10 grams of commercial soybean lecithin, 180 ml. of acetone and 20 ml. of ammonium hydroxide was treated as in the previous examples and the activated lecithin similarly added to carbon refined shark liver oil. The results of stability tests are indicated at VIII in the table.

EXAMPLE IX

A solution of 10 grams of corn oil phosphatide in 90 ml. of petroleum ether, 90 ml. of acetone and 20 ml. of ammonium hydroxide was treated similarly to the previous examples and the activated phosphatide similarly added to carbon-refined shark liver oil. The results of stability tests are indicated at IX in the table.

EXAMPLE X

A mixture of 10 grams of commercial soybean lecithin, 40 ml. of 99% isopropanol and ½% ammonium hydroxide (based on lecithin weight) was treated similarly to the previous example and the treated lecithin added to refined shark liver oil and similarly tested. Stability data are indicated at X in the table.

EXAMPLE XI

The experiment of Example X was repeated except that 1% ammonium hydroxide, based on the lecithin weight, was used instead of ½%. The stability results are indicated at XI in the table.

EXAMPLE XII

The experiments of Examples X and XI were repeated except that 5% of ammonimum hydroxide, based on the lecithin weight, was used instead of ½ or 1%. The stability results are indicated at XII in the table.

EXAMPLE XIII

The experiment of Example X was repeated except that the mixture was heated at reflux temperature for three hours rather than one hour. The stability results are indicated at XIII in the table.

EXAMPLE XIV

The experiment of Example X was repeated except that the mixture was heated at reflux temperature for five hours rather than 1 hour. The stability results are indicated at XIV in the table.

The following table shows in a comparative manner the use of different solvents and various quantities of ammonia in activating phosphatides. The experiments summarized also show the results of stability tests on different samples of refined shark liver oil which were stabilized by the addition thereto of small amounts of activated phosphatides as well as the results of control experiments on samples of refined shark liver oil which did not contain any activated phosphatides. It is desired to point out that in every instance where reflux conditions are mentioned in the above examples and in the table the temperature of treatment was approximately 40° C. to 85° C. depending on the solvent used.

TABLE

*Phosphatide+solvent treated with concentrated ammonium hydroxide and then added to fish liver oil*

[Carbon-refined shark liver oil]

| Example | Phosphatide Added | Per Cent of Ammonia (conc'd. NH₄OH/ Phosphatide) | Time of Treatment, hours | Solvent Used | Per Cent Vitamin Destruction at 34.5 C. After— | | |
|---|---|---|---|---|---|---|---|
| | | | | | 6 days | 14 days | 20 days |
| I | | | | | 47 | | |
| II | 1% corn oil phosphatide | | | | 48–49 | | |
| III | 2% lecithin treated with | 100 | 1 | Acetone | 4.95 | 14.4 | 23. |
| IV | ___do___ | 100 | 1 | Petroleum Ether | 0 | 16.4 | 27. |
| V | ___do___ | 200 | 1 | Acetone+Methanol | 7.15 | 18.6 | 28. |
| VI | ___do___ | 200 | 1 | Acetone+Petroleum ether | 8.5 | 20.0 | 31. |
| VII | ___do___ | 100 | 1 | Petroleum ether+Methanol | 7.3 | 18.0 | 25. |
| VIII | ___do___ | 200 | 1 | Acetone | 7.85 | 17.0 | 27. |
| IX | 2% corn phos. treated with | 200 | 1 | Petroleum ether+Acetone | 4.95 | 18.5 | 28. |
| X | 2% lecithin treated with | ½ | 1 | Isopropanol | 12.7 | 32.4 | |
| XI | ___do___ | 1 | 1 | ___do___ | 9.34 | 26.8 | |
| XII | ___do___ | 5 | 1 | ___do___ | 10.8 | 28 | |
| XIII | ___do___ | ½ | 3 | ___do___ | 11.25 | 29.6 | |
| XIV | ___do___ | ½ | 5 | ___do___ | 8.7 | 26.8 | |

It will be noted from the foregoing table that as compared to the original refined shark liver oil and the sample of refined shark liver oil to which phosphatide had been added (see I and II, table), the oil in every instance showed a very much greater increase in stability as typified by a lower amount of vitamin A destroyed.

In general, the best results, as indicated, were obtained when the solvent used was acetone, although other solvents and mixtures of solvents gave enhanced stability. The quantity of phosphatide added to the oil should be at least about ½% as at this proportion lower stability begins to occur. In general, the upper limits of phosphatide addition are determined by the solubility of the phosphatide in the oil, which is approximately 5%. In the event, however, that a product other than a clear oil is desired, this limit may be exceeded although no particularly better results from the stability standpoint are achieved. The quantity of ammonia used does not appear to be critical. In this connection, the results obtained when as much as 200% ammonia was used and the results obtained when ½% of ammonia was used are to be noted. In general, it is to be noted that the greater quantity of ammonia resulted in a somewhat better antioxidant but the increase was not particularly marked.

It is to be noted that other forms of ammonia rather than concentrated aqueous ammonium hydroxide solution may be used and that when the term "ammonia" is referred to in the claims, concentrated aqueous ammonium hydroxide solution, liquid ammonia and/or gaseous ammonia is intended to be denoted thereby.

As has been pointed out hereinafter, phosphatides, and particularly lecithin as obtained commercially, comprise a mixture of licithin, cephalin, residual fatty oil and free fatty acids. Due to the latter constituent, commercial lecithin is characterized by having an acid value of at least 5 and ranging up to 10 or more. For example, see Examples III, IV, V and VI hereinabove where the commercial lecithin employed had a free fatty acid content of 3.7%. As is well known the acid value of a fatty material is approximately twice the numerical value of the percentage of free fatty acids in such a material. Thus, the acid value of this commercial lecithin was approximately 7.4. In the process of the present invention as specifically illustrated by the several examples set forth above, the positive acid value of the phosphatide commenced with is substantially the same as that of the ammonia treated phosphatide. In view of the foregoing facts, it is apparent that if ammonium soaps are formed with the free fatty acids present in the commercial lecithin at any time in the process, such soaps are split or decomposed during the steps of removing the water and excess ammonia. In other words, the final step wherein the removal of the excess of free ammonia, water and/or solvent is effected by distillation, the fatty acid combined ammonia is also removed as a consequence of a splitting or decomposing what ammonium soaps may have been formed. Thus it is quite apparent that phosphatide products produced in accordance with the process of our invention are entirely different from the neutralized phosphatides produced by the process of United States Patent No. 2,295,179. It is also interesting to note that although quite small amounts of ammonia, e. g., ½% in Examples X, XIII, and XIV, gave excellent results in increasing the antioxidant effect of phosphatides, such small amounts of ammonia were not sufficient to neutralize the amounts of commercial phosphatides employed in those examples. This further illustrates the difference between our products and those of Patent No. 2,295,179. Also, as has previously been pointed out, all of the fatty acid combined ammonia used in our process is removed from the phosphatide in the final step of the process.

This application is a continuation-in-part of our copending application Serial No. 528,354, filed March 27, 1944 now abandoned.

Oleaginous materials stabilized with the improved antioxidants of our invention are claimed in our copending application Serial No. 750,892, filed concurrently herewith.

Having described our invention, what we claim as new and desire to secure by Letters Patent is:

1. A process for enhancing the antioxidant activity of a phosphatide which comprises heating in contact with ammonia a mixture of a phosphatide and a volatile organic solvent in which the phosphatide is at least partially soluble, said solvent having a boiling point of at least about 40° C., the heating being carried out at about the reflux temperature of the solvent, and thereafter removing from the phosphatide the free ammonia admixed therewith, the ammonia combined with the fatty acids in the phosphatide, the volatile organic solvent and any water which is present in the mixture, said removal of the ammonia, the water and the solvent being accomplished by heating the phosphatide under reduced pressure until the ammonium soaps therein are split into free ammonia and free fatty acids and the ammonia is removed from the phosphatide leaving the free fatty acids in the phosphatide.

2. A process for enhancing the antioxidant activity of a phosphatide which comprises heating in contact with concentrated ammonium hydroxide a mixture of a phosphatide and a volatile organic solvent in which the phosphatide is at least partially soluble, said solvent having a boiling point of at least about 40° C., the heating being carried out at about the reflux temperature of the solvent, and thereafter removing from the phosphatide the free ammonia admixed therewith the ammonia combined with the fatty acids in the phosphatide, the volatile organic solvent and any water which is present in the mixture, said removal of the ammonia, the water and the solvent being accomplished by heating the phosphatide under reduced pressure until the ammonium soaps therein are split into free ammonia and free fatty acids and the ammonia is removed from the phosphatide leaving the free fatty acids in the phosphatide.

3. A process for enhancing the antioxidant activity of a phosphatide which comprises heating a mixture of a phosphatide, acetone and concentrated ammonium hydroxide, the heating being carried out at about the reflux temperature of the acetone, and then removing from the phosphatide the free ammonia admixed therewith, the ammonia combined with the fatty acids in the phosphatide, the acetone and any water which is present, said removal of the ammonia, the acetone, and the water being accomplished by heating the phosphatide under reduced pressure until the ammonium soaps therein are split into free ammonia and free fatty acids and the ammonia is removed from the phosphatide leaving the free fatty acids in the phosphatide.

4. A process for enhancing the antioxidant activity of lecithin which comprises heating a mixture of ammonia, commercial lecithin and a volatile organic solvent in which the lecithin is at least partially soluble, said solvent having a boiling point of at least about 40° C., the heating being carried out at about the reflux temperature of the solvent and then removing from the lecithin the free ammonia admixed therewith, the ammonia combined with the fatty acids in the lecithin, the volatile organic solvent and any water which is present in the mixture, said removal of the ammonia, the solvent and the water being accomplished by heating the lecithin under reduced pressure until the ammonium soaps therein are split into free ammonia and free fatty acids and the ammonia is removed from the phosphatide leaving the free fatty acids in the phosphatide.

5. A process for enhancing the antioxidant activity of lecithin which comprises heating a mixture of concentrated ammonium hydroxide, commercial lecithin and a volatile organic solvent in which the lecithin is at least partially soluble, said solvent having a boiling point of at least about 40° C., the heating being carried out at about the reflux temperature of the volatile organic solvent, and then removing from the lecithin the free ammonia admixed therewith, the ammonia combined with the fatty acids in the lecithin, the volatile organic solvent and any water which is present in the mixture, said removal of the ammonia, the solvent and the water being accomplished by heating the lecithin under reduced pressure until the ammonium soaps therein are split into free ammonia and free fatty acids and the ammonia is removed from the phosphatide leaving the free fatty acids in the phosphatide.

6. A process for enhancing the antioxidant activity of lecithin which comprises heating a mixture of concentrated ammonium hydroxide, commercial lecithin and acetone, the heating being carried out at about the reflux temperature of the acetone, and then removing from the lecithin the free ammonia admixed therewith, the ammonia combined with the fatty acids in the phosphatide, the acetone and any water which is present in the mixture, said removal of the ammonia, the acetone and the water being accomplished by heating the lecithin under reduced pressure until the ammonium soaps therein are split into free ammonia and free fatty acids and the ammonia is removed from the lecithin leaving the free fatty acids in the lecithin.

7. The antioxidant activated phosphatide composition obtained by the process of claim 1, the acid value of said composition being substantially no lower than that of the phosphatide composition prior to the ammonia treatment.

8. The antioxidant activated phosphatide composition obtained by the process of claim 2, the acid value of said composition being substantially no lower than that of the phosphatide composition prior to the ammonia treatment.

9. The antioxidant activated phosphatide composition obtained by the process of claim 3, the acid value of said composition being substantially no lower than that of the phosphatide composition prior to the ammonia treatment.

10. The antioxidant activated lecithin composition obtained by the process of claim 4, the acid value of said composition being substantially no lower than that of the lecithin composition prior to the ammonia treatment.

11. The antioxidant activated lecithin composition obtained by the process of claim 5, the acid value of said composition being substantially no lower than that of the lecithin composition prior to the ammonia treatment.

12. The antioxidant activated lecithin composition obtained by the process of claim 6, the acid value of said composition being substantially no lower than that of the lecithin composition prior to the ammonia treatment.

LORAN OID BUXTON.
CHARLES EARLY DRYDEN.

REFERENCES CITED

The following references are of record in the file of this patent:

UNITED STATES PATENTS

| Number | Name | Date |
| --- | --- | --- |
| 2,098,254 | Mattill et al. | Nov. 9, 1937 |
| 2,295,179 | Loane | Sept. 8, 1942 |